United States Patent
Viswambharan et al.

(10) Patent No.: US 11,743,108 B1
(45) Date of Patent: Aug. 29, 2023

(54) DYNAMIC CUSTOMIZATION OF NETWORK CONTROLLER DATA PATH BASED ON CONTROLLER INTERNAL STATE AWARENESS

(71) Applicant: Cisco Technology, Inc., San Jose, CA (US)

(72) Inventors: Rajesh Indira Viswambharan, Karnataka (IN); Apoorva Sharma, Uttar Pradesh (IN); Mamatha Jayanna, Karnataka (IN); Ankur Gupta, Singapore (SG); Ankita Singh, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/695,312

(22) Filed: Mar. 15, 2022

(51) Int. Cl.
  *G06F 15/177* (2006.01)
  *H04L 41/0654* (2022.01)
  *H04L 43/0823* (2022.01)
  *H04L 43/0876* (2022.01)

(52) U.S. Cl.
  CPC ...... *H04L 41/0654* (2013.01); *H04L 43/0823* (2013.01); *H04L 43/0876* (2013.01)

(58) Field of Classification Search
  CPC ............. H04L 41/0654; H04L 43/0823; H04L 43/0876
  See application file for complete search history.

(56) References Cited

U.S. PATENT DOCUMENTS

| | | | |
|---|---|---|---|
| 11,310,155 B1* | 4/2022 | Qian | H04L 45/123 |
| 2004/0215593 A1* | 10/2004 | Sharangpani | G06F 16/90344 |
| 2008/0014920 A1* | 1/2008 | Uppala | H04W 52/0216 |
| | | | 455/425 |
| 2014/0051454 A1* | 2/2014 | Wirtanen | H04W 76/27 |
| | | | 455/452.1 |
| 2014/0376435 A1* | 12/2014 | Morioka | H04W 76/27 |
| | | | 370/311 |
| 2021/0160192 A1* | 5/2021 | Jain | H04L 47/80 |
| 2021/0224183 A1* | 7/2021 | Péan | H04L 43/028 |

(Continued)

FOREIGN PATENT DOCUMENTS

| | | | |
|---|---|---|---|
| CN | 110618912 A | * | 12/2019 |
| CN | 113595832 A | * | 11/2021 |

(Continued)

*Primary Examiner* — Richard G Keehn
(74) *Attorney, Agent, or Firm* — Lee & Hayes, P.C.

(57) ABSTRACT

Techniques for a network controller to manage its data path dynamically in a data network. The techniques include causing the network controller to enter a first state, wherein the first state is associated with first processing rules for processing usage data. The network controller receives first usage data from one or more network devices associated with the data network, processes the first usage data according to the first processing rules. Further, the network controller may detect an event associated with transitioning the network controller to a second state, which cause the network controller to transition from the first state into a second state, wherein the second state is associated with second processing rules for processing the usage data. Moreover, the network controller receives second usage data from the one or more network devices, and processes the second usage data according to the second processing rules.

20 Claims, 6 Drawing Sheets

(56) References Cited

U.S. PATENT DOCUMENTS

| | | | |
|---|---|---|---|
| 2022/0083383 A1* | 3/2022 | Ylinen | G06F 12/0882 |
| 2022/0121362 A1* | 4/2022 | Liu | G06F 3/061 |
| 2022/0124009 A1* | 4/2022 | Metsch | H04L 47/821 |
| 2022/0215101 A1* | 7/2022 | Rioux | G06F 21/55 |
| 2022/0279004 A1* | 9/2022 | Erlingsson | G06F 16/9038 |
| 2022/0321468 A1* | 10/2022 | Mestery | H04L 45/22 |

FOREIGN PATENT DOCUMENTS

| | | | | |
|---|---|---|---|---|
| CN | 114006839 A | * | 2/2022 | |
| CN | 114281657 A | * | 4/2022 | |
| DE | 112019004032 T5 | * | 5/2021 | ......... B60R 16/0231 |
| WO | WO-2017046617 A1 | * | 3/2017 | ......... H04L 63/0227 |
| WO | WO2017046617 A1 | | 3/2017 | |

* cited by examiner

DYNAMIC CUSTOMIZATION OF NETWORK CONTROLLER DATA PATH BASED ON CONTROLLER INTERNAL STATE AWARENESS

TECHNICAL FIELD

The present disclosure relates generally to techniques for intelligent network management and deployment. More specifically, the present disclosure is directed to extending an automated approach for dynamic customization of network controller data path based on its awareness of the network controller internal states.

BACKGROUND

A network controller is software that orchestrates network functions. The network controller serves as an intermediary between the business and the network infrastructure. The organization enters desired business objectives into the controller which in turn sets up the network to deliver on those objectives. Moreover, the network controller job is to maintain an inventory of network devices and their status, configure network devices, identify potential issues, and perform remedial suggestions. The network not only provides basic connectivity but also security, enhanced collaboration, quality and connectivity of service, etc. Therefore, the data network, infrastructure, and management of the network are vital to the success of the organization. Accordingly, a network controller which manages and orchestrates all aspects of the network needs to make sure it is operating flawlessly and delivering on the organization's objectives.

In atypical enterprise setup, network controller (e.g., Digital Data network Center (DNAC)), manages the networking infrastructure with automation and assurance. The network controller monitors the health of the network by processing the usage data sent by the devices. The controller has different services, protocol-specific data collectors (e.g., Configure and Enable Streaming Telemetry (TDL), Hypertext Transfer Protocol (HTTP), Google Remote procedure Call (GRPC), SSH File Transfer Protocol (SFTP), etc.) and purpose-built data pipelines to handle the incoming data for various use cases. Being a computing device, at the normal working conditions, the network controller is supposed to work at its best capacity and optimize the resources among diverse services.

In some scenarios, the network controller may run into certain interim states where they cannot run at their full capacity. For instance, some internal errors, temporary hardware issues, maintenance mode, triaging network outage of a specific site, etc., can reduce the network controller capacity. These can be transitional states, however, the longevity of these states which depends on the severity of the originating cause can cause multiple issues that can affect network performance.

First, during the transition state, depending on the cause, the controller may run into loss of functionality or face challenges to access the available resources. As a result, the controller may not be able to process the same amount of data as it was processing before entering the transition state. Since the network devices are not aware of the current state of the controller, they keep sending the data to the controller as they were configured originally. Furthermore, the controller will not configure network devices dynamically to be aware of the controller's state to send selective usage data to the controller. These in turn can lead to huge data queues and hamper the processing of critical data during this period.

Second, there are no clearly defined internal states such that the controller can perform its operations according to these internal states when it enters the transition state. As a result, in the transition state, since the controller data path is not aware of the internal state of the controller, it cannot perform any special process to process data at the initial layers of the networking stack. Thus, all the data processing operations are performed in user space which is placed in the later stage of the data processing cycle and can reduce controller efficiency.

Third, in some scenarios, (e.g., a typical enterprise) the controller manages multiple sites, associated network devices, and varieties of protocols to collect fault and network Key Performance Parameters (KPIs). In these scenarios, when the state transitions, there is a need to have more customized controller behavior. This includes enabling selective functionality on the controller, and accordingly selectively processing the data.

Thus, to improve the controller performance, there is a need for mechanisms and techniques to process usage data received from the network devices, detect the controller state transition, and cause the controller to stay in its current state or to transition to a different state. Such mechanisms and techniques may improve the overall network performance and user experience by improving the network controller performance.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

Figure 1:
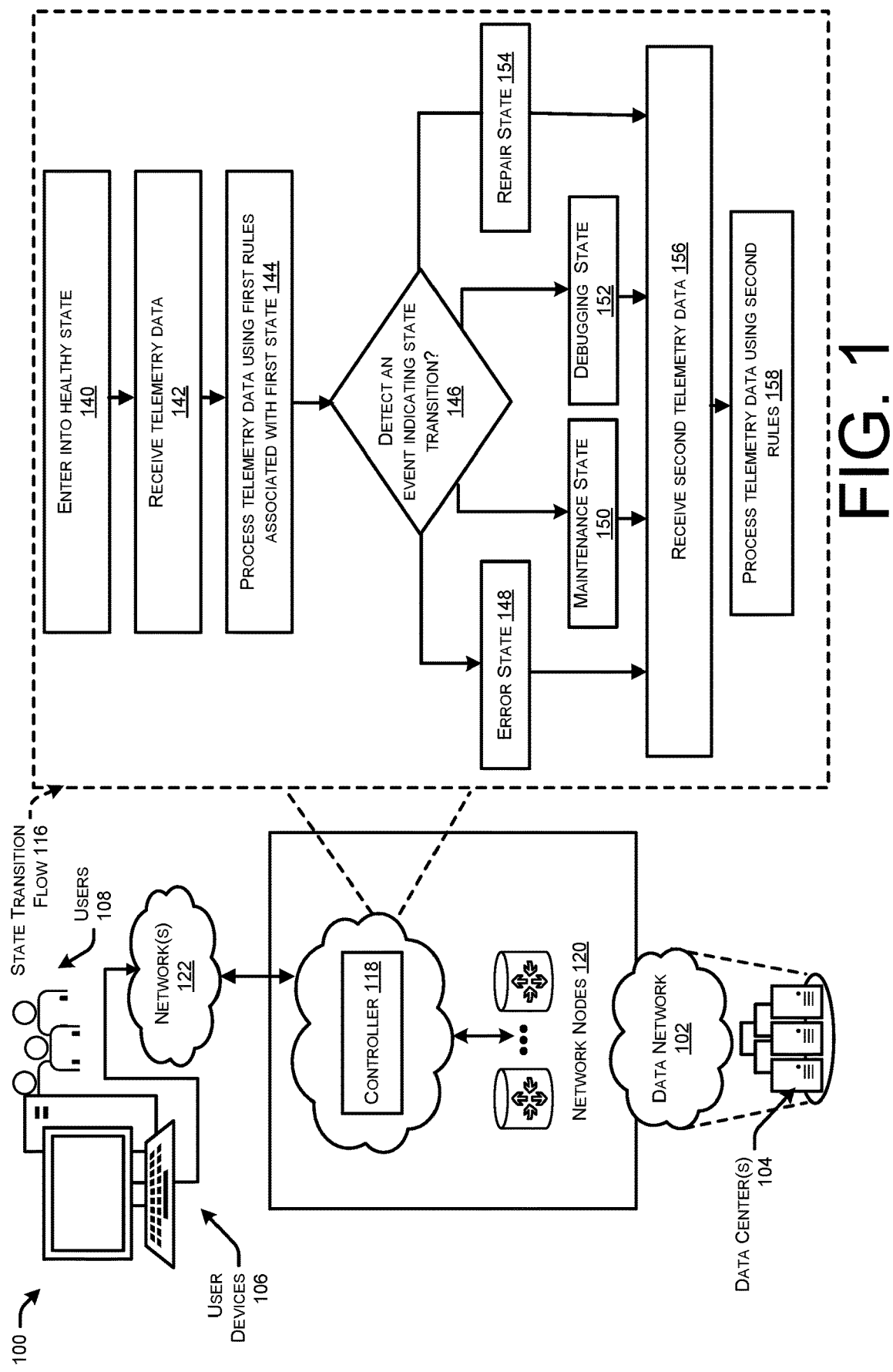
FIG. 1 illustrates a system diagram of an example architecture for detecting a network controller state transition and causing the controller to transition to a different state.

DESCRIPTION OF EXAMPLE EMBODIMENTS
OVERVIEW

The disclosure describes a method for a network controller to manage a data network. Initially, the method may include causing the network controller to enter a first state, wherein the first state is associated with first processing rules for processing usage data. Further, the network controller may receive first usage data from one or more network devices associated with the data network. Additionally, the network controller may process the first usage data according to the first processing rules. Further, the network controller may detect an event associated with transitioning the network controller to a second state. Even further, the method may include causing the network controller to transition from the first state into a second state, wherein the second state is associated with second processing rules for processing the usage data. The network controller may receive second usage data from the one or more network devices. Further, the network controller may process the second usage data according to the second processing rules.

Additionally, the techniques described herein may be performed by a system and/or device having non-transitory computer-readable media storing computer-executable instructions that, when executed by one or more processors, performs the method described above.

EXAMPLE EMBODIMENTS

Today, most network deployed employs Software-Defined Networking (SDN) technology. In an SDN, the network is built around a network controller thus enabling the controller to learn the data network and device configurations, and integrate the knowledge in a way that enables to provide a centralized, programmable point of automation to manage, configure, monitor, and troubleshoot network devices. Using a controller in a structured approach for managing the network devices is a desirable approach to automate, monitor, and troubleshoot the network.

In a typical Enterprise setup, the Network Controller (e.g., Digital Network Architecture Center (DNAC)) manages the networking infrastructure with Automation and Assurance. The Network controller monitors the health of the network by processing the usage data sent by the devices. The controller has different services, protocol-specific data collectors (e.g., TDL, HTTP, GRPC, SFTP, etc.) and purpose-built data pipelines to handle the incoming data for various use cases. Being a computing device, at the normal working conditions, the controller is supposed to work at its best capacity and optimize the resources among diverse services. The techniques described herein include mechanisms to improve controller capacity and optimize the available controller's resources among different network devices.

In some scenarios, the controller may stay in some interim states where it cannot use its full capacity. For example, the controller may not able to operate at its full capacity due to some internal errors, temporary hardware or software issues, maintenance mode, triage network outage, or similar issues. In some cases, the controller may stay in the transition state long enough to reduce controller efficiency. During this transition state, the controller may lose its functionality or may face challenges in obtaining the resource. Accordingly, the network devices may continue transmitting data to the controller as they were configured originally. The techniques and mechanisms described herein include a process to configure the network devices to be aware of the controller state dynamically and to send selective usage data to the controller according to the controller state.

Further, the controller functionality can depend on the controller internal states. In some examples, the techniques and mechanisms described herein enable the controller data path to be aware of the internal state of the controller. Also, the data processing may be divided between the control and user space and Kernel space based on the controller awareness of the data path and the controller state.

In some examples, a network controller architecture is described. The controller architecture may include several internal states, such as healthy state, error state, maintenance state, debugging state, and repair state. The healthy state describes the controller normal working state, in which the controller operates at its best capacity. When some unexpected application errors such as service crashes, hardware or software failure security attacks, resources unavailability, occurs the controller may enter the error state. In some scenarios, the controller may remain in a prolonged error state until a recovery process causes the controller to transition to a different state. When some maintenances or planned activity such as software upgrade, hardware upliftment, etc., are required, the controller may manually transition to the maintenance state. In the debugging state, the controller may triage any major network outages related to a network site, major security attacks, or controller internal issues. Once the controller transitions to the repair state, the controller may use a self-recovery process to recover from the error state.

In some examples, the controller may include a State Transition Controller. The STC may manage the entire life cycle of the transitioning states. In some variants, the STC may offer mechanisms for registering the states, detecting the state transition, orchestrating the associated scripts in the respective Kernel layer, and dynamically configuring the network devices.

In some examples, the controller may include a mechanism for dynamically managing the data path. In this approach, the controller data path may be adjusted dynamically according to the scope of functions associated with the controller internal state. Additionally, in some scenarios, the user may desire to customize the data path according to the available controller resources or the controller internal state. The techniques described herein include an Extended Berkeley Packet Filter (eBPF) for handling data path in xDP or traffic control (TC) layer of the networking stack, which may be dynamically orchestrated by STC whenever STC detects transition in the state. In some variants, the STC may build a State Context (SC) from dynamically gleaned information that is used by eBPF. The SC captures the required dynamic information associated with the state. In addition, the SC may include an intelligent process to glean the required information to be added in SC.

Further, to optimize the controller performance, the controller may adjust the data path according to the processing priority of different services managed by the controller. For example, in order to adjust the traffic according to the available controller resources, the controller may delay processing some of the lower priority services order to process the higher processing process.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system diagram of an example architecture 100 for the management of network controller state transition. System architecture 100 includes a data network 102 that may include one or more data centers 104, and in which users 108 of user devices 106 utilize a domain-specific language to express and compile network functions to perform network operations. FIG. 1 further illustrates a network controller 118 in the data network 102 deploying a dynamic data path customization to optimize network management resources in the data network 102.

In some examples, the data network 102 may include devices housed or located in one or more data centers 104. The data network 102 may include one or more networks implemented by any viable communication technology, such as wired and/or wireless modalities and/or technologies. The data network 102 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The data network 102 may include devices, virtual resources, or other nodes that relay packets from one network segment to another by nodes in the computer network. The data network 102 may include multiple devices that utilize the network layer (and/or session layer, transport layer, etc.) in the OSI model for packet forwarding, and/or other layers. The data network 102 may include various hardware devices, such as routers, switches, gateways, smart Network Interface Controllers (NICs), NICs, Application Specific Integrated Circuits (ASICs), Field Programmable Gate Arrays (FPGAs), servers, and/or any other type of device. Further, data network 102 may include virtual resources, such as VMs, containers, and/or other virtual resources.

The one or more data centers 104 may be physical facilities or buildings located across geographic areas designated to store networked devices that are part of the data network 102. The data centers 104 may include various networking devices, as well as redundant or backup components and infrastructure for power supply, data communications connections, environmental controls, and various security devices. In some examples, the data centers 104 may include one or more virtual data centers which are a pool or collection of cloud infrastructure resources specifically designed for enterprise needs, and/or for cloud-based service provider needs. Generally, the data centers 104 (physical and/or virtual) may provide basic resources such as processor (CPU), memory (RAM), storage (disk), and networking (bandwidth). However, in some examples, the devices in the data network 102 may not be located in explicitly defined data centers 104 but may be located in other locations or buildings.

The user devices 106 may establish communication connections over one or more networks 122 to communicate with devices in the data network 102, such as the network controller 118 of the data network 102. The network(s) 122 may include any viable communication technology, such as wired and/or wireless modalities and/or technologies. Network(s) 122 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof. The user devices 106 may communicate using any type of protocol over the network(s) 122, such as the transmission control protocol Internet protocol (TCP/IP) that is used to govern connections to and over the Internet.

The controller 118 may monitor the health of data network 102 by processing the usage data received from network nodes 120 (network device) located in the data network 102. The controller 118 may collect data from the network nodes 120 using specific data collection protocols (e.g., TDL, HTTP, GRPC, SFTP, etc.), and a purpose-built data pipeline to handle the incoming data for different uses cases. The controller 118 may be implemented in hardware and software and may include a state transition component to enable the controller to work at its best capacity and optimize the resources among the network devices. Controller 118 may use shared memory (e.g., RAM), and data buffers shared among different network devices. The controller 118 may include a device deployable configuration including the controller internal states detection and transition flow management. The controller configuration may define the controller 118 functionality and enables the controller 118 to detect an event associated with the network controller state transitions. In some examples, the controller configuration may be configured by a state aware mechanism that configures the controller based on the controller's 118 internal state.

At "140," the network controller 118 enters into a healthy state. The healthy state is a normal controller working state, whereby the controller operates at its best capacity. When the controller is in a healthy state, it may decide to stay in the healthy state or to transition to a different state. Additionally, the controller may monitor the network's health and optimize its resources while remaining in a healthy state.

At "142," the controller may receive a first usage data from the network devices. The first usage data may indicate the health of the network devices and includes metrics, logs, traces, etc. collected using a set of the automated communication process. The first usage data may be received through different data paths associated with different users. The data path may be customized for each user according to the priority of the service assigned to different users and the network controller available resources.

At "144," the controller may process the collected usage data according to a processing rule to determine if a state transition is needed. The usage data may be analyzed using usage data models to drive insights on data activities, through the analysis of events associated with the controller internal states. Such analysis can provide insights for the network users or controller to understand usage data activities and optimize the controller performance.

At "146," the controller may detect an event associated with transitioning the network controller based on the processed data of step 144. The network controller may include a State Transition Controller (STC) which handles the complete life cycle management of the transitioning state. STC may register the controller state, detect the state transition and configure the controller for the transition to a different state. The state transition flow 116 describes the process of state transition detection and transitioning to a new state. As illustrated, depending on the detected state transition, the controller may proceed to one of error state 148, maintenance state 150, debugging state 152, and repair state 154 described below.

At "148," the controller enters an error state due to some unexpected application errors such as service crashes, hardware or software failures, resource exhaustion issues, security attack. In some scenarios, the controller may stay in the error state until a recovery process removes the cause of the error, and transition the controller to a different state.

At "150," the controller enters a maintenance state. In the maintenance state for planned activities such as software updates, hardware upgrades, troubleshooting network problems, etc. In some examples, the controller may enter the maintenance mode based on its awareness of its internal state before a network problem occurs. In some examples, the controller may wait for a problem to happened and then enter the maintenance state.

At "152," the controller enters debugging state. In the debugging state, the users may want to triage a major network outage related to a network site, a major security attack, or controller related to the controller operation. The debug state may be programmed using an Extended Berkeley Packet Filter (eBPF). The information associated with the controller state may be transmitted dynamically to the eBPF.

At "154," the controller enters the repair state. The controller may enter into this state to recover from the error state or if the detected event determines a state transition to the repair state, for example for a self-recovery process. In the self-recovery process, the network problems may be resolved without the need for a user (e.g., users 108) to get involved. The repair state may include a self-recovery process derived based on collected usage data. In some examples, the self-recovery process may be adjusted dynamically according to collected usage information which can determine events associated with what caused the controller to enter the error state.

At step "156," the controller may receive a second usage data. The controller. The network controller may analyze the second usage data to drive insights on data activities, through the analysis of events associated with the controller internal states. Such analysis can provide insights for the network users or controller to understand usage data activities and optimize the controller performance.

At step "158," the controller processes the second usage data according to a second processing rule. Further, the controller may determine if a state transition is needed. The second usage data may be analyzed using usage data models to drive insights on data activities, through the analysis of events associated with the controller internal states. Such analysis can provide insights for the network users or controller to understand usage data activities and optimize the controller performance.

In order to detect the events associated with the state transition, controller 118 may perform a pattern search and match algorithm to find the best configuration pattern that matches the controller state configuration that has changed. The pattern search and match algorithm may be part of the STC data model. In some examples, the pattern search and match algorithm may be a Longest Prefix Mach (LPM) algorithm. The LPM may find the best match from a set of templates stored in a look-up table.

In some examples, the STC may create a State context (SC) for the underlying state of the controller. Accordingly, the STC may capture the required dynamic information associated with the state. In some examples, the STC may have the intelligence to glean the required info to be added in SC. Further, the SC may dynamically adjust the eBPF execution behavior and may add the state context to the eBPF map, which is used in eBPF configuration. In some implementation, BPF_MAP_TYPE_HASH may be used as a map type with the value part having the custom data structure to capture the SC.

It is appreciated that the controller may customize the data path according to its available resources, and the priority of processing different services. For instance, the controller may support customizing the data paths associated with different services according to their priority. As a result, in some scenarios, when a high priority and low priority traffic are received, the controller may drop the low priority traffic to process the high priority traffic. In some examples, the controller states may be customized to cover mechanisms to detect custom states, and associated functions to be triggered for the custom states.

In some examples, the process described above may be implemented by hardware and software agnostic models, where reliance on hardware or a specific platform is not required. A hardware-agnostic system may not require any modifications to run on a variety of network devices. Thus, the hardware-agnostic design brings about a high level of compatibility across most common network devices which is suitable for a brownfield environment.

Figure 2:
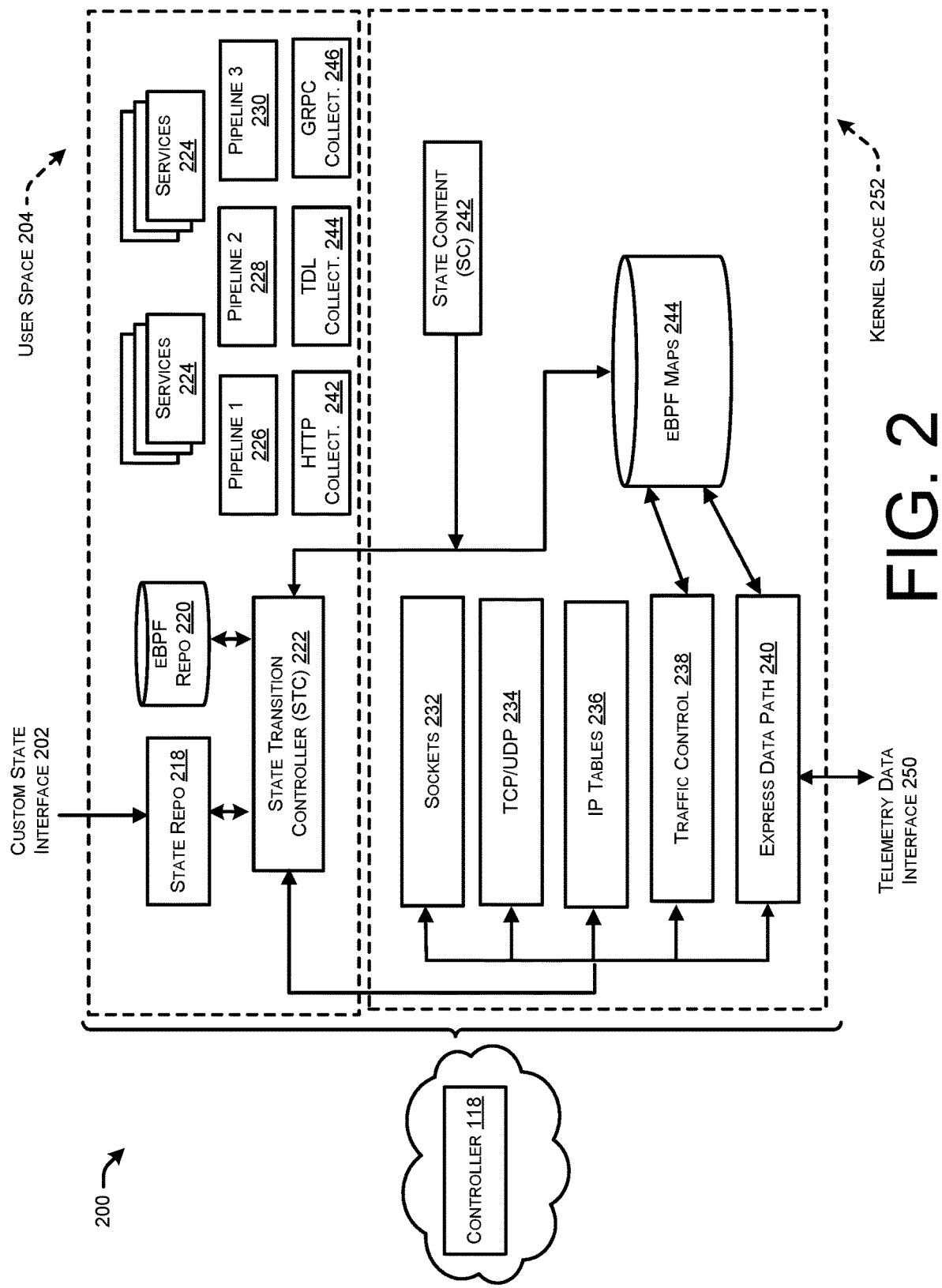
FIG. 2 illustrates a system diagram of an example architecture for a network controller with state transitions detection and management capability.

FIG. 2 illustrates a system diagram of an example architecture 200 for a network controller with state transitions detection and management capability. Architecture 200 includes a User-Space 204 where user processes will run and a Kernel space 252 where Kernel processes will run. Further FIG. 2 illustrates a network controller 118 utilizing a dynamic data path customization to optimize the network management resources in the data network 102. The controller 118 may include custom state interface 202 defining the custom states, and the usage interface 250 for receiving/transmitting the usage data from/to the network devices.

The User-Space 204 may include services 224 to be processed according to services associated rules. The state Repo 218 may maintain the controller internal states as described herein previously. The eBPF Repo 220 may be utilized to analyze the network traffic. Further, the eBPF Repo 220 may provide an interface to data link layers, permitting raw link-layer packets to be sent and received. The STC 222 may be responsible for detecting the state of the controller. Further, the STC 222 may orchestrate the eBPF Repo 220 may include scripts pertaining to the state on the respective hook points (e.g., xDP or TC hooks), and may handle the data path traffic according to the state. For example, the eBPF 220's scripts added in the hook point may be single executable or chained programs that use "Tails-Calls".

In some examples, STC 222 may create State Content (SC) 248 for the underlying state of the controller. The SC 248 may capture the required dynamic information associated with the state. Additionally, the STC 222 may have the intelligence to glean the required info to be added in SC 248. In some implementations, the context may dynamically adjust the eBPF Rep 220 execution behavior. Accordingly, the SC 248 may be added to eBPF maps 250, which is used in eBPF programs stored in eBPF Repo 220. As described herein, BPF MAP TYPE HASH may be used as a map type with the value part having the custom data structure to capture the SC 248. For example, some sample information associated with the state content pertaining to the state includes:

(i) CURRENT_CONTROLLER_STATE
(ii) DATA_CRITICALITY_FILTER
(iii) DEVICE_CRITICALITY_FILTER
(iv) SITE_FILTER
(v) ENABLE_TRACE_POINTS
(vi) BLOCKED_SERVICES
(vii) BLOCKED_PROTOCOLS The controller 118 may receive data from the network devices via the express data path 240. In some examples, the network devices may not be aware of the controller state, and the received data may be received at the controller 118 through other channels (e.g., User Interface (UI), headless request). When the data packet enters the network stack, the eBPF program may be executed at the respective hook points (e.g., xDP layer, TC etc.). Later, the program may access the SC 248 info from eBPF map 250, and may use it in the eBPF execution. eBPF programs stored in eBPF Repo 220 can update execution specific info in the eBPF map 250. eBPF map 250 can be used by both eBPF programs and user space applications. For example, when controller 118 analyzes the unprocessed request statistics when the controller is in a healthy state, then the meta info captured as part of the eBPF map 250 will be very useful. Further, when the controller moves back to the Healthy State, STC 222 unloads the eBPF programs in the Kernel path for efficiency purposes.

As illustrated, the user space 204 may include pipelines 226, 228, 230, and their associated protocols HTTP collector 242, TDL collector 244, and GRPC collector 246 which can manage various data pipelines. This may enable the controller 118 to selectively enable and process specific data types. In some examples, other type of data collection protocols such as HTTP, GRPC, SFTP, etc. may be used be used for TDL 244.

The network sockets 232 may include a software structure that may serve as an endpoint for sending/receiving usage data to/from the network devices. The TCP/UDP unit 234 may include protocols for defining the communication between the controller 118 and the network devices. IP table 236 may include IP addresses of network devices existing in the data network 102, or any other data network (e.g., network(s) 122), which is connected to the controller 118. The traffic control unit 238 may include programs that may manage to route the traffic from the network 102 to the network 122 or vice versa.

Figure 3:
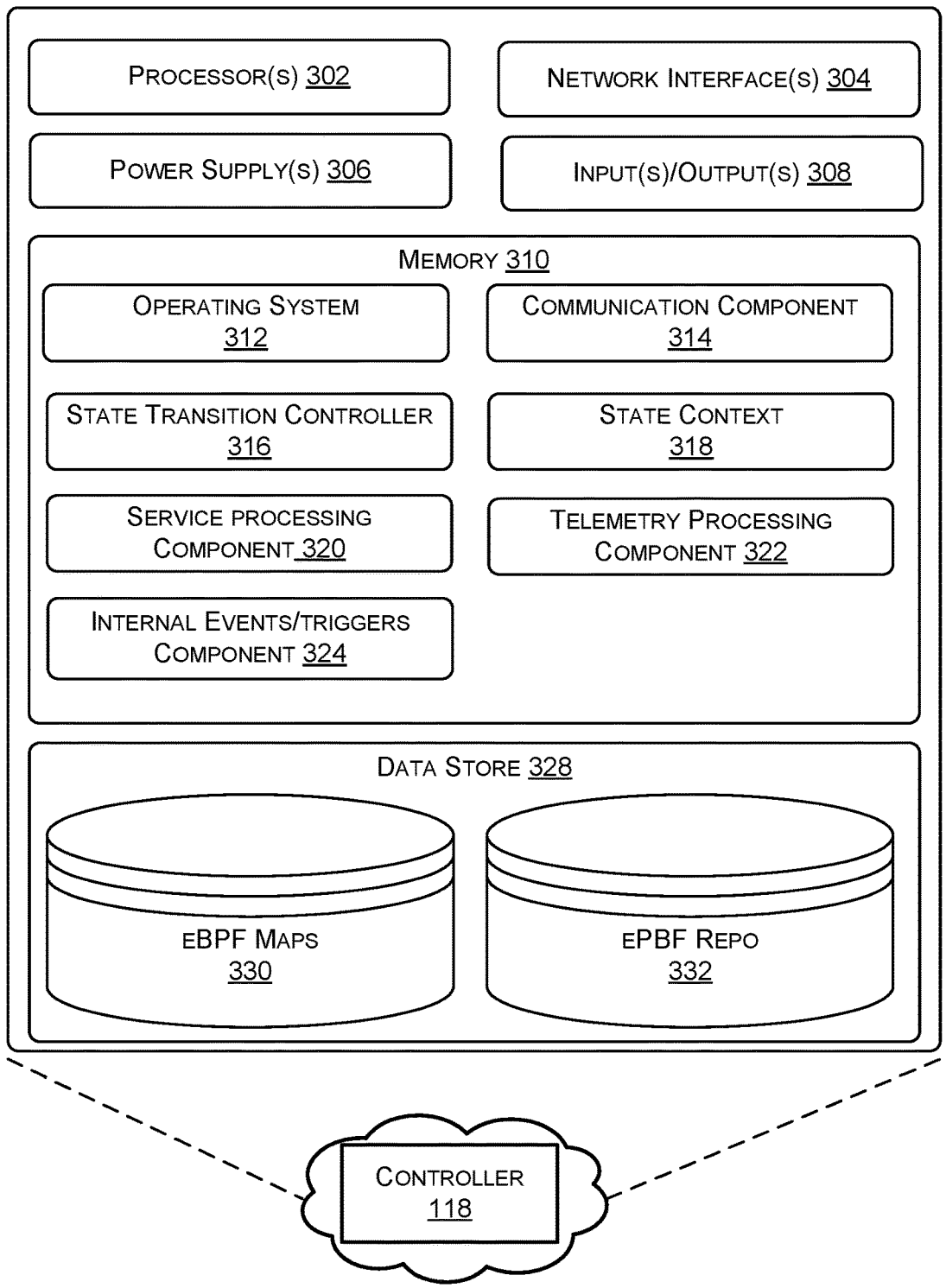
FIG. 3 illustrates a component diagram of an example network controller that can be utilized to implement aspects of the technologies disclosed herein.

FIG. 3 illustrates a component diagram 300 of an example network controller 118 that can be utilized to implement aspects of the technologies disclosed herein. The controller 118 may be any type of computing device capable of receiving usage data via a suitable data communications network device such as, but not limited to, a laptop or desktop computer, a tablet computing device, a server computer, a television, or a mobile telephone.

As illustrated, the controller 118 may include one or more hardware processors 302 (processors), one or more devices, configured to execute one or more stored instructions. The processor(s) 302 may comprise one or more cores. Further, controller 118 may include one or more network interfaces 304 configured to provide communications between controller 118 and/or other systems or devices in data network 102 and/or remote from the data network 102. The network interfaces 304 may include devices configured to couple to personal area networks (PANs), wired and wireless local area networks (LANs), wired and wireless wide area networks (WANs), and so forth. For example, the network interfaces 304 may include devices compatible with Ethernet, Wi-Fi, and so forth.

The controller 118 can include one or more power supplies 322, such as one or more batteries, connections to mains power, etc. The controller 118 can also include one or more inputs and outputs 308 for receiving and processing input from a number of input devices, such as a keyboard, a mouse, a touchpad, a touch screen, an electronic stylus, or other types of input device. Further, the input/outputs 308 can include a display, such as a computer monitor, a flat-panel display, a digital projector, a printer, or other types of output device. It will be appreciated that the user device controller 118 might not include all of the components shown in FIG. 3, can include other components that are not explicitly shown in FIG. 3, or might utilize an architecture completely different than that shown in FIG. 3.

The controller 118 may also include memory 310, such as computer-readable media, that stores various executable components (e.g., software-based components, firmware-based components, etc.). The memory 310 may generally store components to implement the functionality described herein. The memory 310 may store an operating system 312 utilized to control the operation of components of the controller 118. Further, the memory 310 may store a communication component 314 that comprises software (e.g., any protocol stack) to enable the controller 118 to communicate with other devices using the network interface 304.

In some examples, memory 310 may store an STC 316 configured to enable the controller 118 to handle the complete life cycle of the transitioning state. Further, the STC 316 may be configured to enable the controller 118 to subscribe to various internal events, such as APM triggers, user actions for any manually trigger states, etc. The STC 316 may comprise a human readable code or binary machine code, when executed on the processor 302, may enable the controller 118 to detect state transitions, and register the controller state.

In some example, the memory 318 may store an SC 318 configured to enable the controller 118 to capture information associated with the controller state. The STC 316 may manage the information captured by the SC 318. The SC 318 may comprise a human readable code or binary machine code, when executed on the processor 302, may enable the controller 118 to captures the state information.

In some examples, the memory 310 may store a service processing component 320 configured to enable the controller 118 to process services according to associated rules. The service processing component 320 may manage various data pipelines to enable the controller 118 to selectively process specific data paths. The service processing component 320 may comprise a human readable code or binary machine code, when executed on the processor 302, may enable the controller 118 to collect and process data to selectively process specific data paths.

In some examples, the memory 310 may store a usage data processing component 322 configured to enable the controller device 118 to obtain and process the usage data. The usage data may include usage data of network nodes (devices) 120 representing the devices functionality such as hardware settings, protocols, network service, accessibility, port configuration, throughput, etc. Additionally, the usage data of each device may represent the link quality of the device. The usage component may comprise a human readable code or binary machine code, when executed on the processor 302, may enable the controller 118 to communicate to the devices, and obtain the usage data from the network devices via network interface 304.

In some examples, the memory 310 may store an internal events/triggers component 324 configured to enable the controller device 118 to manage various internal services and events. Further, the internal event/trigger component 324 may enable the STC 31 to subscribe to various internal events, APM triggers, and user actions for manual triggers.

The controller 118 may further include a data store 328, which may comprise any type of computer memory including long-term memory (e.g., Read Only Memory (ROM), Random Access Memory (RAM), caches, etc.). The data store 328 may include an eBPF Maps 328 that includes a set of rules and information underlying controller 118 associated to the controller internal state and state transition. Further, the data store 328 may include an eBPF Repo, which include eBPF programs that enable the controller 118 to access eBPF maps 330, and process the services according to the associated rules.

Figure 4:
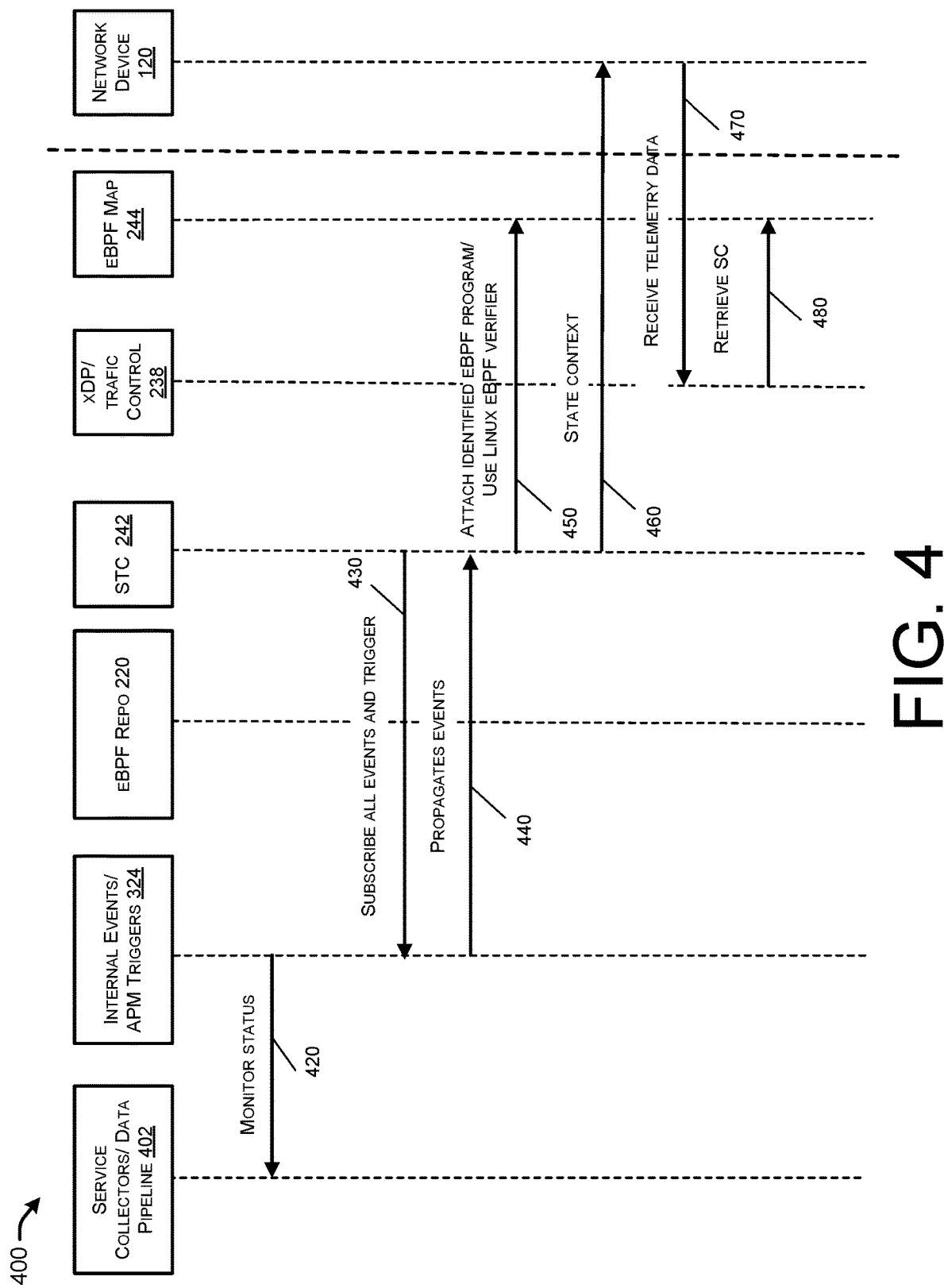
FIG. 4 illustrates a flow diagram of an example method for detecting network controller state transitions and management.

FIG. 4 illustrates a flow diagram of an example method 400 for detecting a network controller state transitions detection and management. Additionally, FIG. 4 illustrate communication flow between the network devices according to some aspect described herein.

At step 420, the service collector 402 monitor the controller status. The service collectors 402 also manages various data pipelines according to the associated protocols and rules for detecting events such as various internal events, APM triggers, and user actions (e.g., manually triggered states). The service collector 402 may include services 224, pipelines 226, 228, 230, and the protocols 242, 244, 246 of FIG. 2.

At step 430, the controller 118 is subscribed to all events and triggers. The events and triggers may include various internal events, APM triggers, and user actions for manually triggered states.

At step 440, the internal events/triggers 324 propagate the events to the STC 222. The STC 222 may use the events for detecting controller state transitions. Further, the STC 222 may handle the state transition direction by checking subscribed internal events and APM triggers, and orchestrate eBPF programs, and capturing the SC used in the program execution.

At step 450, the STC 222 attaches identified eBPF programs on the respective hook paths. The STC 222 uses Linux eBPF verifier to load the eBPF programs. The eBPF added in the hook points could be single executable or chained programs.

At step 460, the SC is added to the eBPF maps 250 which is used in the execution of eBPF programs. Further, the STC 222 sends a flag to indicate what kind of data type is allowed, or any specific data services required. The SC also dynamically adjusts the eBPF execution behavior.

At step 470, the xDP/traffic controller 238 receives usage data from the network device(s) (network nodes) 120. The usage data may be collected using specific data collection protocols (e.g., TDL, HTTP, GRPC, SFTP, etc.,), and purpose-built data pipeline to handle the incoming data for different used cases. The usage data may indicate the health of the network devices and the link quality.

At step 480, the eBPF program processes the usage data according to a processing rule to detect the events associated with transitioning the controller to a different state. Based on the detected events, the controller may determine whether node or data is critical to the controller state. If neither is critical, the packet may be dropped.

Figure 5:
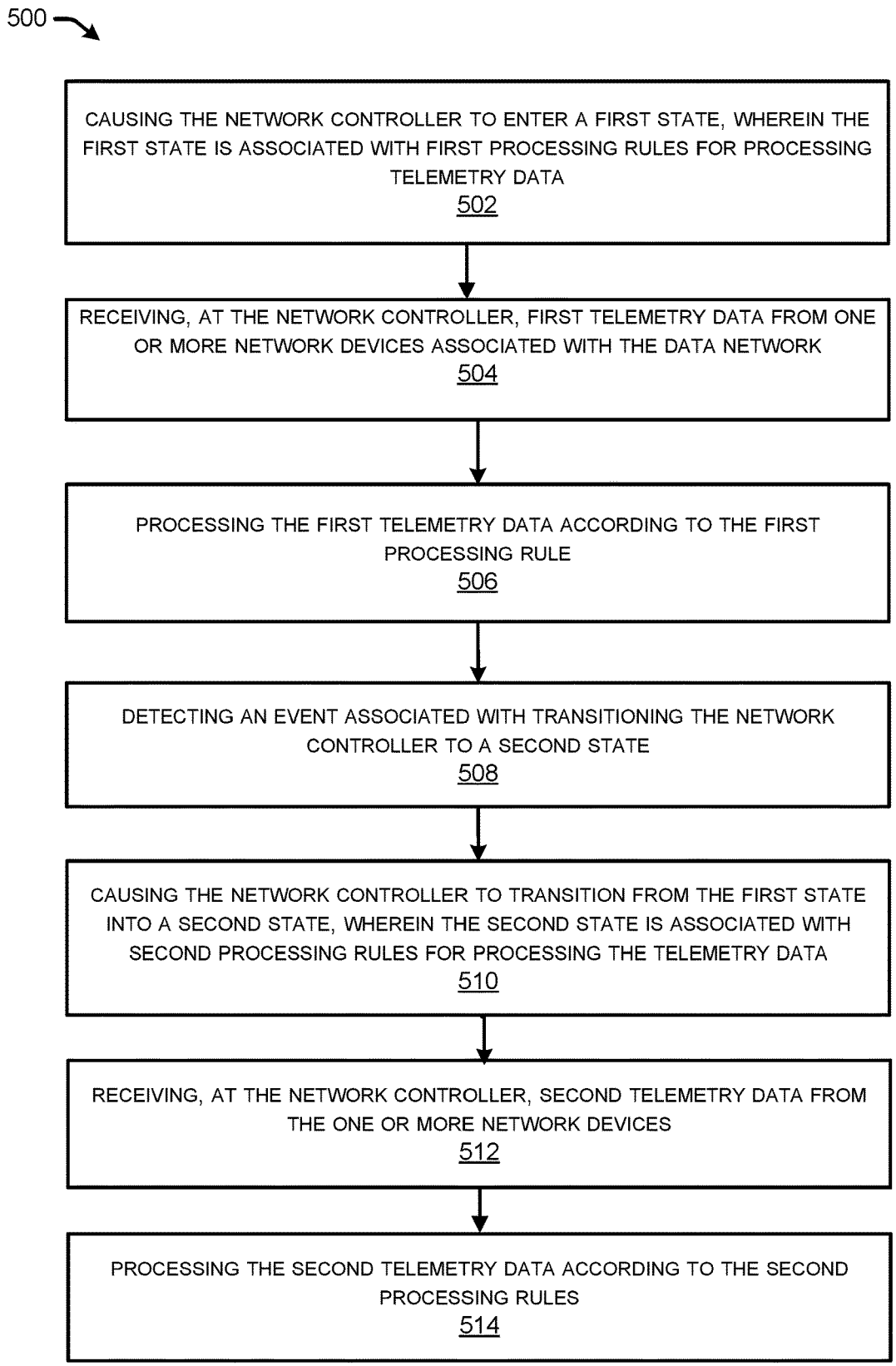
FIG. 5 illustrates a flow diagram of an example method for a network controller to detect its state transitions and cause the network controller to transition to a different state.

FIG. 5 illustrates a flow diagram of an example method for a network controller to detect its state transitions and cause the network controller to transition to a different state.

At step 502, a network controller enters a first state, wherein the first state is associated with first processing rules for processing usage data A first state may be one of a healthy state, error state, maintenance state, debugging state, and repair state as described previously. The first state may be determined based on the controller operation and functionality.

At step 504, the controller may receive the first usage data from one or more network devices associated with the data network. The first usage data may determine the network health and link quality. The first usage data may include throughput, logs, routing information, or measurements at the network devices, etc., which may help troubleshoot or configure the data path.

At step 506, the network controller processes the first usage data according to the first processing rule at a first rate. The first processing rule may determine rules for data path management. For example, the rule may adjust the controller data path dynamically to the scope of functionality offered according to the transitioned state of the controller.

At step 508, the controller may detect an event associated with transitioning the network controller to a second state. The STC component of a controller may be responsible for detecting the state transition of the controller. In addition, the STC may process various internal events to trigger the controller transition.

At step 510, the network controller is the transition from the first state into a second state, wherein the second state is associated with second processing rules for processing the usage data. A second state may be one of a healthy state, error state, maintenance state, debugging state, and repair state as described previously. The second state may be determined based on STC mechanisms. In some examples, the controller may perform a remedial action to repair the error in the repair state. In some examples, the state transition may be performed by receiving an input command from an administrator (e.g, users 108). In this scenario, the network controller 118 may transition to a different state according to the received commands.

At step 512, the network controller receives second usage data from the one or more network devices. The second usage data may determine the network health and link quality. The second usage data may include throughput, logs, routing information, or measurements at the network devices, etc., which may help troubleshoot or configure the data path.

At step 514, the network controller may process the second usage data according to a priority defined at least partly by the second processing rules at a second rate. The first processing rule may determine rules for data path management. For example, the rule may adjust the controller data path dynamically to the scope of functionality offered according to the transitioned state of the controller. Further, the second usage data includes causing an extended Berkeley Packet Filter (eBPF) script to execute in a kernel space of the network controller according to the second processing rules.

Figure 6:
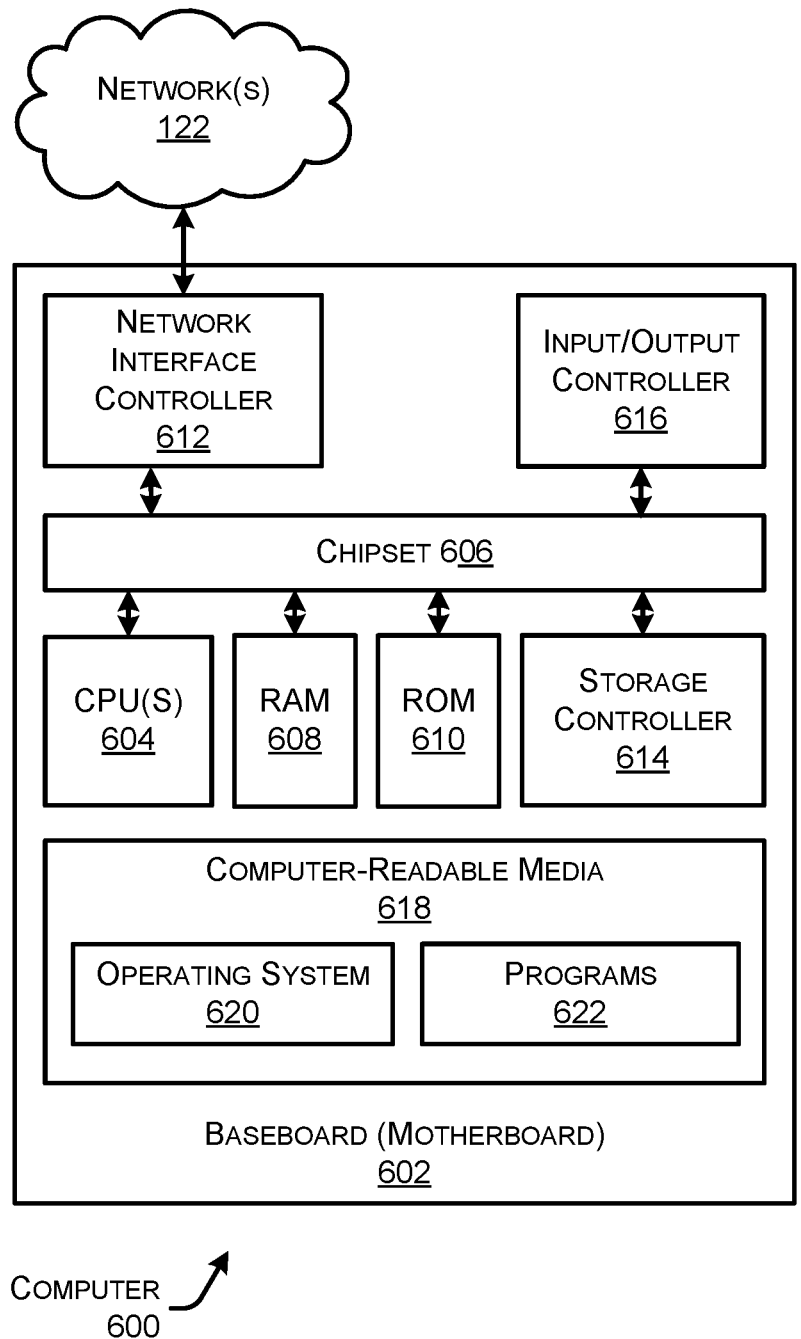
FIG. 6 is a computer architecture diagram showing an illustrative computer hardware architecture for implementing a computing device that can be utilized to implement aspects of the various technologies presented herein.

FIG. 6 shows an example computer architecture for a device capable of executing program components for implementing the functionality described above. The computer architecture shown in FIG. 6 illustrates any type of computer 600, such as a conventional server computer, workstation, desktop computer, laptop, tablet, network appliance, e-reader, smartphone, or other computing device, and can be utilized to execute any of the software components presented herein. The computer 600 may, in some examples, correspond to a network controller 118, and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 600 includes a baseboard 602, or "motherboard," which is a printed circuit board to which a multitude of components or devices can be connected by way of a system bus or other electrical communication paths. In one illustrative configuration, one or more central processing units ("CPUs") 604 operate in conjunction with a chipset 606. The CPUs 604 can be standard programmable processors that perform arithmetic and logical operations necessary for the operation of the computer 600.

The CPUs 604 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 can provide an interface to a RAM 608, used as the main memory in the computer 600. The chipset 606 can further provide an interface to a computer-readable storage medium such as a read-only memory ("ROM") 610 or non-volatile RAM ("NVRAM") for storing basic routines that help to startup the computer 600 and to transfer information between the various components and devices. The ROM 610 or NVRAM can also store other software components necessary for the operation of the computer 600 in accordance with the configurations described herein.

The computer 600 can operate in a networked environment using logical connections to remote computing devices and computer systems through a network, such as the network(s) 122. The chipset 606 can include functionality for providing network connectivity through a NIC 612, such as a gigabit Ethernet adapter. The NIC 612 is capable of connecting the computer 600 to other computing devices over the network 122. It should be appreciated that multiple NICs 612 can be present in the computer 600, connecting the computer to other types of networks and remote computer systems.

The computer 600 can be connected to a storage device 618 that provides non-volatile storage for the computer. The storage device 618 can store an operating system 620, programs 622, and data, which have been described in greater detail herein. The storage device 618 can be connected to the computer 600 through a storage controller 614 connected to the chipset 606. The storage device 618 can consist of one or more physical storage units. The storage controller 614 can interface with the physical storage units through a serial attached SCSI ("SAS") interface, a serial advanced technology attachment ("SATA") interface, a fiber channel ("FC") interface, or other types of interface for physically connecting and transferring data between computers and physical storage units.

The computer 600 can store data on the storage device 618 by transforming the physical state of the physical storage units to reflect the information being stored. The specific transformation of physical state can depend on various factors, in different embodiments of this description. Examples of such factors can include but are not limited to, the technology used to implement the physical storage units, whether the storage device 618 is characterized as primary or secondary storage, and the like.

For example, the computer 600 can store information to the storage device 618 by issuing instructions through the storage controller 614 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 600 can further read information from the storage device 618 by detecting the physical states or characteristics of one or more particular locations within the physical storage units.

In addition to the mass storage device 618 described above, the computer 600 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 600. In some examples, the operations performed by the user device 106, network controller 118, and or any components included therein, may be supported by one or more devices similar to computer 600. Stated otherwise, some or all of the operations performed by user device 106 and/or network controller 118, and or any components included therein, may be performed by one or more computer devices 600.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 618 can store an operating system 620 utilized to control the operation of the computer 600. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 618 can store other system or application programs and data utilized by the computer 600.

In one embodiment, the storage device 618 or other computer-readable storage media is encoded with computer-executable instructions which, when loaded into the computer 600, transform the computer from a general-purpose computing system into a special-purpose computer capable of implementing the embodiments described herein. These computer-executable instructions transform the computer 600 by specifying how the CPUs 604 transition between states, as described above. According to one embodiment, the computer 600 has access to computer-readable storage media storing computer-executable instructions which, when executed by the computer 600, perform the various processes described above with regard to FIGS. 1-5. The computer 600 can also include computer-readable storage media having instructions stored thereupon for performing any of the other computer-implemented operations described herein.

The computer 600 can also include one or more input/output controllers 616 for receiving and processing input from a number of input devices, such as a keyboard, a mouse, a touchpad, a touch screen, an electronic stylus, or other type of input device. Similarly, an input/output controller 616 can provide output to a display, such as a computer monitor, a flat-panel display, a digital projector, a printer, or other type of output device. It will be appreciated that the computer 600 might not include all of the components shown in FIGS. 1-4, can include other components that are not explicitly shown in FIG. 6, or might utilize an architecture completely different than that shown in FIG. 6.

As described herein, the computer 600 may comprise one or more of a user device 106, a network controller 118, and/or any other device. The computer 600 may include one or more hardware processors 604 (processors) configured to execute one or more stored instructions. The processor(s) 604 may comprise one or more cores. Further, the computer 600 may include one or more network interfaces configured to provide communications between the computer 600 and other devices, such as the communications described herein as being performed by the user device 106 or network controller 118. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 622 may comprise any type of programs or processes to perform the techniques described in this disclosure for configuring the network controller to perform complete life cycle management including detecting the state transition and registering its state.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for a network controller to manage a data network, the method comprising:
   causing the network controller to enter a first state, wherein the first state is associated with first processing rules for processing usage data;
   receiving, at the network controller, first usage data from one or more network devices associated with the data network;
   processing the first usage data according to the first processing rules;
   detecting an event associated with transitioning the network controller to a second state;
   causing the network controller to transition from the first state into the second state, wherein the second state is associated with second processing rules for processing the first usage data;
   receiving, at the network controller, second usage data from the one or more network devices; and
   processing the second usage data according to the second processing rules.

2. The method of claim 1, wherein processing the second usage data includes causing an extended Berkeley Packet Filter (eBPF) script to execute in a kernel space of the network controller according to the second processing rules.

3. The method of claim 1, wherein:
   while in the first state, the network controller processes the first usage data at a first rate;
   while in the second state, the network controller processes the second usage data at a second rate that is less than the first rate; and
   the network controller processes the second usage data according to a priority defined at least partly by the second processing rules.

4. The method of claim 1, wherein:
   detecting the event associated with transitioning the network controller to the second state includes determining that the network controller is experiencing an error;
   causing the network controller to transition from the first state into the second state includes transitioning the network controller into an error state; and
   when determined that the network controller experiences an error, the method further comprises:
      determining whether the network controller is unable to perform self-recovery; and
      when determined that the network controller is unable to perform self-recovery causing the network controller to remain in the error state.

5. The method of claim 4, further comprising:
   receiving user input that causes the network controller to transition into a repair state; and
   repairing the error by executing a remedial action in the repair state.

6. The method of claim 1, further comprising:
   receiving user input from an administrator associated with the network controller,
      wherein detecting the event associated with transitioning the network controller to the second state includes determining that the user input includes a command to transition the network controller to the second state.

7. The method of claim 1, wherein the second state is a maintenance state in which a maintenance process is performed to upgrade at least one of firmware, software, or hardware of the network controller.

8. The method of claim 1, wherein:
   detecting the event associated with transitioning the network controller to the second state includes determining that the network controller is experiencing an error;
   causing the network controller to transition from the first state into the second state, wherein the second state is a repair state; and
   the method further comprising performing a remedial action that remedies the error.

9. The method of claim 1, further comprising:
   analyzing the first usage data;
   updating the first processing rules based on analyzing the first usage data;
   analyzing the second usage data; and
   updating the second processing rule based on the analyzing the second usage data.

10. The method of claim 1, wherein causing the network controller to transition from the first state into the second state includes a State Transition Controller (STC) which manages state detection while the network controller is transiting from the first state to the second state.

11. The method of claim 10, further comprises:
capturing information associated to the first state from the first usage data;
creating a State Context (SC) associated with the first state from the captured information; and
updating the STC with the SC.

12. A system for managing a data network, the system comprising:
one or more processors; and
one or more non-transitory computer-readable media storing computer-executable instructions that, when executed by one or more processors, cause the one or more processors to:
cause a network controller to enter a first state, wherein the first state is associated with first processing rules for processing usage data;
receive, at the network controller, first usage data from one or more network devices associated with the data network;
process the first usage data according to the first processing rules;
detect an event associated with transitioning the network controller to a second state;
cause the network controller to transition from the first state into a second state, wherein the second state is associated with second processing rules for processing the first usage data;
receive, at the network controller, second usage data from the one or more network devices; and
process the second usage data according to the second processing rules.

13. The system of claim 12, wherein processing the second usage data includes causing an extended Berkeley Packet Filter (eBPF) script to execute in a kernel space of the network controller according to the second processing.

14. The system of claim 12, wherein:
while in the first state, the network controller processes the first usage data at a first rate;
while in the second state, the network controller processes the second usage data at a second rate that is less than the first rate; and
the network controller processes the second usage data according to a priority defined at least partly by the second processing rules.

15. The system of claim 12, wherein:
when the first usage data indicates a failure in the one or more network devices, the computer-executable instructions further cause the one or more processors to:
determine a recovery process to transition from the first state to the second state; and
cause the network controller to transition from the first state to the second state.

16. The system of claim 12, wherein detecting the event includes:
determining that the network controller is experiencing an error;
causing the network controller to transition from the first state into the second state includes transitioning the network controller into an error state; and
wherein the computer-executable instructions further cause the one or more processors to:
determine that the network controller is unable to perform self-recovery; and
cause the network controller to remain in the error state.

17. The system of claim 16, wherein the computer-executable instructions further cause the one or more processors to:
receive user input from an administrator associated with the network controller, wherein detecting the event associated with transitioning the network controller to the second state includes determining that the user input includes a command to transition the network controller to the second state.

18. The system of claim 12, wherein the second state is a maintenance state in which a maintenance process is performed to upgrade at least one of firmware, software, or hardware of the network controller.

19. The system of claim 12, wherein:
detecting the event associated with transitioning the network controller to the second state includes determining that the network controller is experiencing an error;
causing the network controller to transition from the first state into the second state includes transitioning the network controller into a repair state; and
wherein the computer-executable instructions further cause the one or more processors to perform a remedial action that remedies the error.

20. One or more non-transitory computer-readable media storing computer-executable instructions that, when executed by one or more processors, cause the one or more processors to:
cause a network controller to enter a first state, wherein the first state is associated with first processing rules for processing usage data;
receive, at the network controller, first usage data from one or more network devices associated with a data network;
process the first usage data according to the first processing rules;
detect an event associated with transitioning the network controller to a second state;
cause the network controller to transition from the first state into a second state, wherein the second state is associated with second processing rules for processing the first usage data;
receive, at the network controller, second usage data from the one or more network devices; and
process the second usage data according to the second processing rules.

* * * * *